US008763957B1

(12) United States Patent
Higham et al.

(10) Patent No.: US 8,763,957 B1
(45) Date of Patent: Jul. 1, 2014

(54) SPACECRAFT TRANSFER ORBIT TECHNIQUES

(71) Applicant: Space Systems/Loral, Inc., Palo Alto, CA (US)

(72) Inventors: John Higham, Mountain View, CA (US); Scott Tilley, Los Altos Hills, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 81 days.

(21) Appl. No.: 13/647,207

(22) Filed: Oct. 8, 2012

(51) Int. Cl.
*B64G 1/10* (2006.01)

(52) U.S. Cl.
USPC ...................................... 244/158.6; 244/164

(58) Field of Classification Search
USPC ................. 244/158.6, 158.5, 158.8, 164, 165
See application file for complete search history.

(56) References Cited

U.S. PATENT DOCUMENTS

| | | | | | |
|---|---|---|---|---|---|
| 5,067,672 | A | * | 11/1991 | Bouzat | 244/158.5 |
| 5,222,023 | A | * | 6/1993 | Liu et al. | 701/13 |
| 5,349,532 | A | * | 9/1994 | Tilley et al. | 701/13 |
| 5,459,669 | A | * | 10/1995 | Adsit et al. | 701/13 |
| 5,562,266 | A | * | 10/1996 | Achkar et al. | 244/171 |
| 5,595,360 | A | * | 1/1997 | Spitzer | 244/158.5 |
| 5,597,142 | A | * | 1/1997 | Leung et al. | 244/164 |
| 5,984,236 | A | * | 11/1999 | Keitel et al. | 244/164 |
| 6,015,116 | A | * | 1/2000 | Anzel et al. | 244/169 |
| 6,032,904 | A | * | 3/2000 | Hosick et al. | 244/169 |
| 6,113,035 | A | * | 9/2000 | Hubert | 244/169 |
| 6,186,446 | B1 | * | 2/2001 | Tilley et al. | 244/164 |
| 6,253,125 | B1 | * | 6/2001 | Barker | 701/13 |
| 6,285,928 | B1 | * | 9/2001 | Tilley et al. | 701/13 |
| 6,296,207 | B1 | * | 10/2001 | Tilley et al. | 244/169 |
| 6,305,646 | B1 | * | 10/2001 | McAllister et al. | 244/158.8 |
| 6,409,124 | B2 | * | 6/2002 | Fleeter | 244/158.5 |
| 6,481,672 | B1 | * | 11/2002 | Goodzeit et al. | 244/169 |
| 6,561,461 | B2 | * | 5/2003 | Goldstein et al. | 244/158.5 |
| 6,588,708 | B2 | * | 7/2003 | Wang et al. | 244/171 |
| 6,695,263 | B1 | * | 2/2004 | Goodzeit | 244/164 |

(Continued)

FOREIGN PATENT DOCUMENTS

EP 209429 A1 1/1987
EP 209429 B1 10/1988

OTHER PUBLICATIONS

Fearn, "Orbit-Raising, Past and Present—the X-Series of Spacecraft andArtemis", Presented at the 29th International Electric Propulsion Conference, Princeton University, Oct. 31-Nov. 4, 2005.

*Primary Examiner* — Christopher P Ellis
*Assistant Examiner* — Medhat Badawi
(74) *Attorney, Agent, or Firm* — Weaver Austin Villeneuve & Sampson LLP

(57) ABSTRACT

Spacecraft transfer orbit operations include separating a spacecraft from a launch vehicle, while in a launch vehicle transfer orbit. The spacecraft includes a propulsion subsystem and a spacecraft controller that controls the spacecraft in a three-axis stabilized mode. With the spacecraft continuously in the three-axis stabilized mode, one or more orbit raising maneuvers are performed by firing either or both of a chemical thruster and an electric thruster firing. Any two consecutive orbit raising maneuvers are separated by a respective intervening coast period. While in the three-axis stabilized mode, the spacecraft does not rotate about any axis at a rate greater than 0.1 degree/sec and dumping of momentum stored in a reaction wheel system is avoided.

19 Claims, 3 Drawing Sheets

(56) References Cited

U.S. PATENT DOCUMENTS

| | | | |
|---|---|---|---|
| 8,016,240 B2 * | 9/2011 | Caplin et al. | 244/158.5 |
| 8,056,863 B2 * | 11/2011 | Wang et al. | 244/164 |
| 8,315,749 B2 * | 11/2012 | Ih et al. | 701/13 |
| 8,346,410 B2 * | 1/2013 | Seo et al. | 701/13 |
| 2007/0228218 A1 * | 10/2007 | Brumfield et al. | 244/171 |
| 2012/0097796 A1 * | 4/2012 | Munir et al. | 244/158.6 |
| 2012/0097797 A1 * | 4/2012 | Woo et al. | 244/158.6 |
| 2012/0248253 A1 * | 10/2012 | Cheetham | 244/158.8 |

\* cited by examiner

SPACECRAFT TRANSFER ORBIT TECHNIQUES

TECHNICAL FIELD

This invention relates generally to spacecraft momentum management and, in particular, to minimizing propellant consumption for attitude control and momentum management during orbit transfer operations.

BACKGROUND

The assignee of the present invention manufactures and deploys spacecraft for, commercial, defense and scientific missions. On board propulsion systems of such spacecraft are frequently required to perform orbit raising (or transfer). For example, there is frequently a requirement for commercial spacecraft to perform orbit raising from a launch vehicle transfer orbit (or "parking orbit") to, for example, a geosynchronous orbit. Following separation from the launch vehicle, the spacecraft then performs transfer orbit operations to transfer the spacecraft from the parking orbit to the geosynchronous orbit. The transfer orbit operations conventionally include firing a liquid apogee motor (LAM) and/or firing low thrust electric thrusters. After the spacecraft has completed its transfer orbit, the spacecraft may be reconfigured into an "on-orbit" three axis stabilized configuration.

Transfer orbit operations following launch vehicle separation typically include initial spin up about a spin axis, LAM and/or electric thruster firings, coast periods, spin rate changes, and reorientation of the spin axis during and between firings Alternatively, orbit raising operations may be conducted in a three-axis stabilized configuration, but such transfer orbit operations entail accumulation of momentum in reaction wheels, and periodic offloading, (or "dumping") of the momentum by thruster firings during and between LAM firings. The above mentioned operations of changing the satellite spin rate, dumping momentum, and reorienting a spinning satellite consume, undesirably, an appreciable amount of propellant

SUMMARY

The present inventors have appreciated that transfer orbit operations may, advantageously, be carried out, while avoiding spin-stabilization of the spacecraft. More particularly, following launch vehicle separation, and throughout a series of LAM and/or electric thruster orbit raising maneuvers, and/or intervening coast periods, the satellite may be continuously in a three-axis stabilized mode wherein rotation rates about all axes are zero or very small (less than 0.1 degree per sec). Advantageously, dumping of momentum accumulated in a momentum storage system during each respective intervening coast period is avoided.

While in such a three-axis stabilized mode, attitude knowledge may be provided by one or more star trackers. Advantageously, reliance on an earth or sun sensor may be avoided.

The star trackers may be configured to provide continuous inertial sensing over a 4π steradian field of view. Control authority for maintaining satellite orientation may be provided by on board reaction wheels. The on board reaction wheels may be commandably configured to provide a spacecraft momentum bias, or a zero momentum bias. While in three-axis stabilized mode, the spacecraft may be oriented to a "sun-safe" orientation to provide, for example, a desired power and/or thermal balance. The "sun-safe" orientation may be selected, for example, before or between orbit raising maneuvers. During orbit raising maneuvers, while still in the three-axis stabilized mode, the spacecraft may be oriented to align a thrust vector of the LAM and/or electric thruster along a desired steering profile. Reorientation from a sun-safe orientation to an orientation desired for an orbit raising maneuver may be performed by a slow slew of the spacecraft, using reaction wheels. As a result of the disclosed techniques, a requirement to use propellant for such reorientation, for spinning or despinning the spacecraft, and for momentum dumping during coast periods is substantially eliminated.

In an embodiment a method for performing spacecraft transfer orbit operations may include separating a spacecraft from a launch vehicle, while in a launch vehicle transfer orbit, the spacecraft including a propulsion subsystem and a spacecraft controller; controlling the spacecraft in a three-axis stabilized mode; and performing, with the spacecraft continuously in the three-axis stabilized mode, one or more orbit raising maneuvers. Each orbit raising maneuver may include either or both of a chemical thruster firing and an electric thruster firing. Any two consecutive orbit raising maneuvers may be separated by a respective intervening coast period. While in the three-axis stabilized mode, the spacecraft does not rotate about any axis at a rate greater than 0.1 degree/sec and dumping of momentum stored in a momentum storage system during each respective intervening coast period is avoided.

In an embodiment, a solar array may be deployed prior to performing the one or more orbit raising maneuvers.

In another embodiment, the momentum storage system may include one or more reaction wheels and control authority for maintaining spacecraft orientation may be provided by one or both of the reaction wheels and thrusters. In some embodiments, control authority for maintaining spacecraft orientation may be provided only by the reaction wheels. During the orbit raising maneuvers, the spacecraft may be in a maneuver orientation wherein a thrust vector of either or both of the chemical thruster and the electric thruster is aligned along a steering profile. During at least one of the intervening coast periods, the spacecraft is in a sun-safe orientation.

In an embodiment, reorientation from the sun-safe orientation to the maneuver orientation may be performed by a slow slew of the spacecraft, using reaction wheels. The reorientation may be performed without use of propellant.

In another embodiment, at least one orbit raising maneuver includes a chemical thruster firing and not an electric thruster firing.

In an embodiment, a spacecraft includes a propulsion subsystem and a spacecraft controller. The spacecraft controller may be configured to control the spacecraft in a three-axis stabilized mode, wherein, while in the three-axis stabilized mode, the spacecraft does not rotate about any axis at a rate greater than 0.1 degree/sec and dumping of momentum stored in a momentum storage system during each respective intervening coast period is avoided. The spacecraft controller may cause the propulsion subsystem to perform, while the spacecraft is continuously in the three-axis stabilized mode, one or more orbit raising maneuvers, each orbit raising maneuver comprising either or both of a chemical thruster firing and an electric thruster firing, any two consecutive orbit raising maneuvers being separated by a respective intervening coast period.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
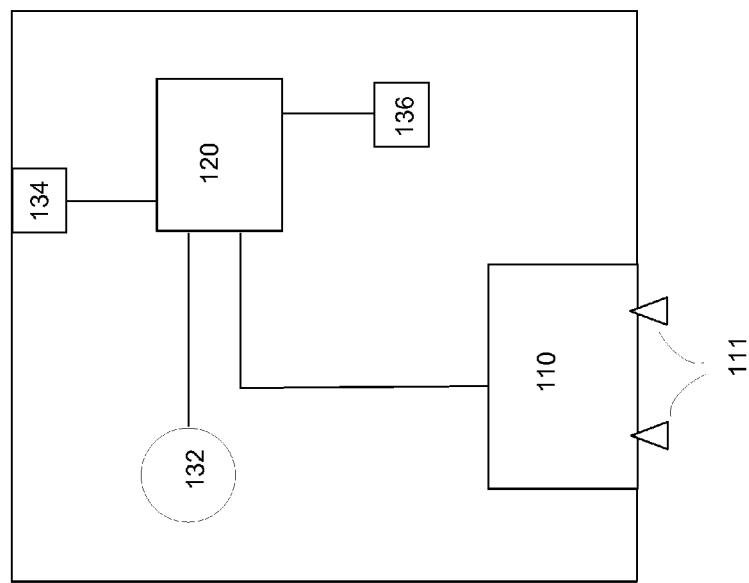
FIG. 1 illustrates an example block diagram of a spacecraft according to an embodiment.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

Referring now to FIG. 1, an example block diagram of a spacecraft 100 according to an embodiment is illustrated. Spacecraft 100 may include propulsion subsystem 110 and spacecraft controller 120. In an embodiment, for example, propulsion subsystem 110 may include propulsion equipment, such as tankage and control and service devices (not illustrated) and thrusters 111. Based on the respective primary energy source, each thruster 111, may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arcjets that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall effect thruster, a wakefield accelerator, and a traveling wave accelerator, for example.

Referring still to FIG. 1, spacecraft controller 120 may include or be included in a spacecraft attitude and orbit control subsystem. In the illustrated example, spacecraft controller 120 is communicatively coupled with propulsion subsystem 110 and may be configured to control the operation of propulsion subsystem 110, including thrusters 111.

In an embodiment, spacecraft controller 120 may be configured to control the spacecraft in a three-axis stabilized mode. As used herein, and in the claims, being in a three-axis stabilized mode means that the spacecraft does not rotate about any axis at a rate greater than 0.1 degree/sec.

Advantageously, spacecraft controller 120 may be configured to cause the propulsion subsystem to perform, while the spacecraft is continuously in the three-axis stabilized mode, one or more orbit raising maneuvers. Each orbit raising maneuver may include either or both of a chemical thruster firing and an electric thruster firing. Two consecutive orbit raising maneuvers may be separated by a respective intervening coast period.

Figure 2:
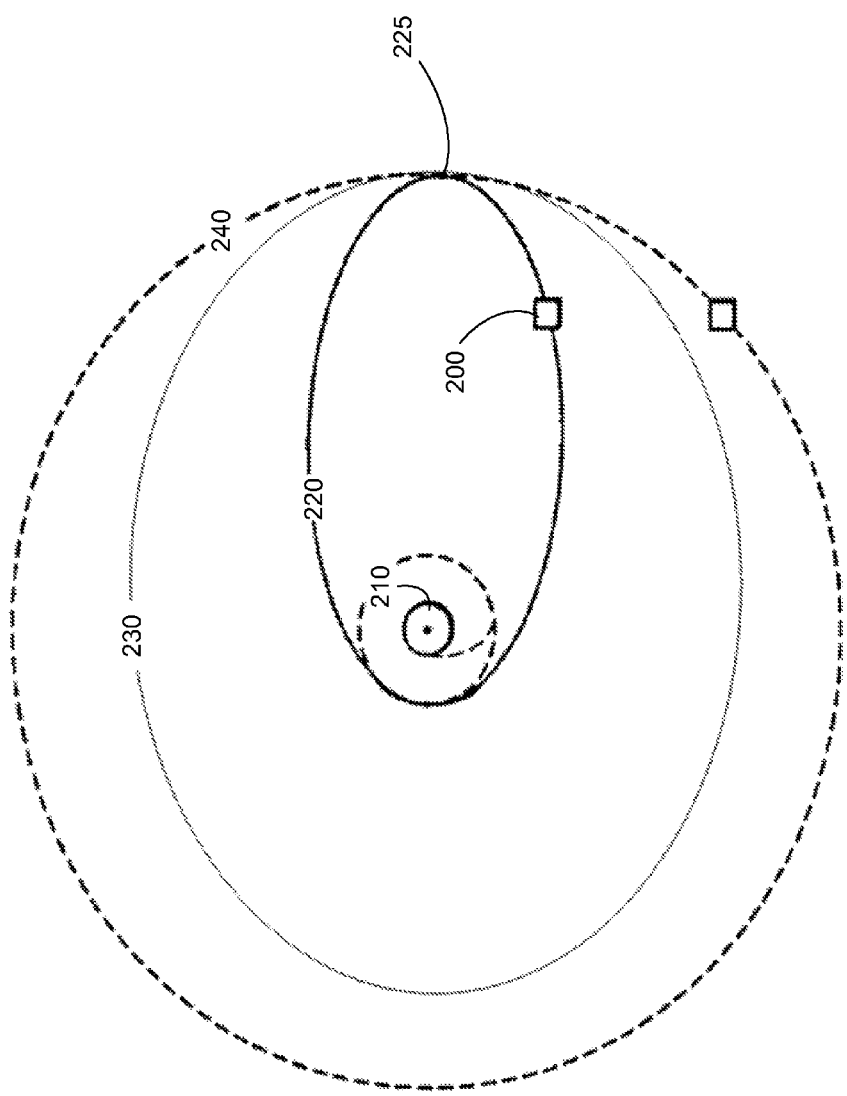
FIG. 2 illustrates an example of spacecraft orbit raising maneuvers.

The term "orbit raising maneuver" as used herein, and in the claims, may be better appreciated by referring to FIG. 2. Spacecraft 200 may ordinarily be inserted by a launch vehicle into transfer orbit 220 about earth 210. Transfer orbit 220 may be elliptical, as illustrated, with an apogee altitude approximately equal to the altitude of the intended final orbit 240 and with a perigee altitude substantially lower than the intended final orbit 240. Orbit raising maneuvers may be executed near the apogee 225 in order to raise the perigee altitude and circularize the orbit. Two or more such orbit raising maneuvers may be contemplated. In the illustrated example, intermediate orbit 230 may result from first orbit raising maneuver. Following a coast period, a second orbit raising maneuver may be executed to place the spacecraft into intended final orbit 240.

Referring again to FIG. 1, in the illustrated embodiment, spacecraft controller 120 is also communicatively coupled with a momentum storage system 132. Momentum storage system 132, which may include, for example, one or more reaction wheels, may be configured to exchange accumulated momentum to a spacecraft rate, and thereby reduce the propellant usage associated with a thruster actuation. Momentum storage system 132 may have a storage capacity that may be described, for example, in terms of a permissible range of reaction wheel speeds. To the extent that the momentum storage capacity of momentum storage system 132 would otherwise be exceeded, wheel desaturation (momentum "dumping") may need to be performed by an external actuator, such as a thruster. Advantageously, spacecraft controller 120 and momentum storage system 132 are configured such that dumping of momentum stored in a reaction wheel system is avoided, at least during coast periods.

Referring still to FIG. 1, spacecraft 100 may also include one or more star trackers 134 and inertial sensors 136. Inertial sensor 136 may include a gyro, for example. In an embodiment, determination of spacecraft attitude and angular rotation rates ("rates") may be performed by spacecraft controller 120 using outputs from star tracker 134 and inertial sensor 136 and/or other attitude sensors such as Sun and Earth sensors. Advantageously, determination of spacecraft attitude may be performed using only the output of star tracker 134.

It will be appreciated that control authority for maintaining satellite orientation in, for example, the three-axis stabilized mode may be provided by one or both of momentum storage system 132 and thrusters 111. Advantageously, control authority for maintaining satellite orientation is provided only by the momentum storage system 132.

In an embodiment, spacecraft controller 120 may be configured to control a thrust vector of one or more of thrusters 111, such that an operating thruster is aligned along a steering profile. The thrust vector may be controlled, for example, by gimballing thruster 111. Alternately, or in addition, the thrust vector may be controlled by adjusting an attitude of spacecraft 100. For example, by using control authority provided by one or both of momentum storage system 132 and thrusters 111, the spacecraft attitude may be actively controlled or adjusted so as to be maintained in a desired maneuver orientation.

As noted hereinabove, each of a series of sequential orbit raising maneuvers may be separated from a preceding orbit raising maneuver by an intervening coast period. Advantageously, during one or more of such intervening coast periods, the spacecraft may be configured in a sun-safe orientation. "Sun-safe orientation" as the term is used herein, and in the claims, means that orientation of the spacecraft with respect to the sun and/or rotation rates and axis of rotation results in spacecraft electrical power and thermal parameters being maintained within acceptable limits. For example, the spacecraft may be configured such that solar panels are at a favorable orientation with respect to the sun.

In an embodiment, reorientation from such a sun-safe orientation to the maneuver orientation is performed by a slow slew of the spacecraft, using momentum storage system 132. Advantageously, the reorientation may be performed without use of propellant. In an embodiment, at least one orbit raising maneuver includes a chemical thruster firing and not an electric thruster firing. A solar array may be either stowed or deployed for orbit raising maneuvers that are performed by, at least, a chemical thruster firing.

Figure 3:
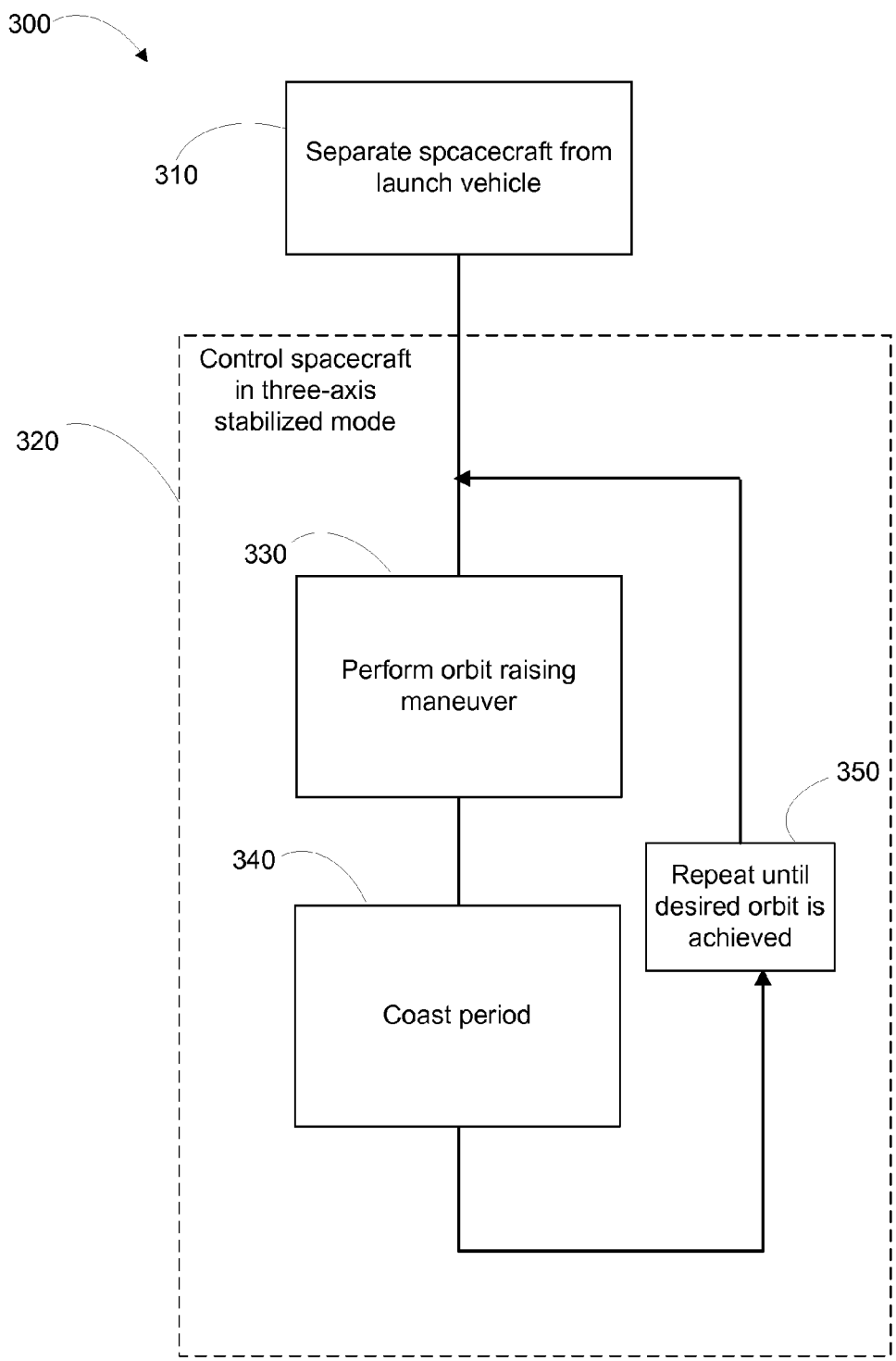
FIG. 3 illustrates an example spacecraft transfer orbit method.

Referring now to FIG. 3, a method 300 of performing spacecraft transfer orbit operations will be described. At block 310, a spacecraft may be separated from a launch vehicle, the launch vehicle having placed the spacecraft in a launch vehicle transfer orbit. Advantageously, the spacecraft includes a propulsion subsystem and a spacecraft controller.

At block 320, the spacecraft may be controlled in a three-axis stabilized mode. As indicated hereinabove, being in a three-axis stabilized mode means that the spacecraft does not rotate about any axis at a rate greater than 0.1 degree/sec.

At block 330, while the spacecraft is continuously controlled in the three-axis stabilized mode, an orbit raising maneuver may be performed. The orbit raising maneuver may include firing a chemical thruster and/or an electric thruster firing. Two consecutive orbit raising maneuvers may be separated by a respective intervening coast period, block 340. At block 350, a sequence of performing an orbit raising maneuver block 330 and a coast period 340 may be repeated until a desired orbit is achieved.

Advantageously, while in the three-axis stabilized mode, dumping of momentum stored in a reaction wheel system is avoided, at least during coast periods. For example, momentum dumping may be performed only during orbit raising maneuvers, and not during coast periods.

In an embodiment, control authority for maintaining spacecraft orientation is provided by one or both of an onboard momentum storage system and thrusters. Advantageously, the control authority for maintaining spacecraft orientation is provided only by on board reaction wheels.

Orbit raising maneuvers may be performed at block 330 while the spacecraft is in a maneuver orientation such that a thrust vector of either or both of the chemical thruster and the electric thruster is aligned along a steering profile.

In an embodiment during at least one of the intervening coast periods block 340, the spacecraft is in a sun-safe orientation. Reorientation from the sun-safe orientation to the maneuver orientation is performed by a slow slew of the spacecraft, using reaction wheels. Advantageously, the reorientation may be performed without use of propellant.

Thus, spacecraft transfer orbit techniques have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for performing spacecraft transfer orbit operations, the method comprising:
    separating a spacecraft from a launch vehicle, while in a launch vehicle transfer orbit, the spacecraft comprising a propulsion subsystem and a spacecraft controller;
    controlling the spacecraft in a three-axis stabilized mode; and
    performing, with the spacecraft continuously in the three-axis stabilized mode, one or more orbit raising maneuvers, each orbit raising maneuver comprising either or both of a chemical thruster firing and an electric thruster firing, any two consecutive orbit raising maneuvers being separated by a respective intervening coast period, wherein,
        while in the three-axis stabilized mode, the spacecraft does not rotate about any axis at a rate greater than 0.1 degree/sec and dumping of momentum stored in a momentum storage system during each respective intervening coast period is avoided.

2. The method of claim 1, further comprising deploying, prior to performing the one or more orbit raising maneuvers, a solar array.

3. The method of claim 1, wherein the momentum storage system comprises one or more reaction wheels and control authority for maintaining spacecraft orientation is provided by one or both of the reaction wheels and thrusters.

4. The method of claim 3, wherein control authority for maintaining spacecraft orientation is provided only by the reaction wheels.

5. The method of claim 1, wherein during the orbit raising maneuvers, the spacecraft is in a maneuver orientation wherein a thrust vector of either or both of the chemical thruster and the electric thruster is aligned along a steering profile.

6. The method of claim 5, wherein during at least one of the intervening coast periods, the spacecraft is in a sun-safe orientation.

7. The method of claim 6, wherein reorientation from the sun-safe orientation to the maneuver orientation is performed by a slow slew of the spacecraft, using reaction wheels.

8. The method of claim 7, wherein the reorientation is performed without use of propellant.

9. The method of claim 1, wherein, at least one orbit raising maneuver comprises a chemical thruster firing and not an electric thruster firing.

10. A spacecraft comprising a propulsion subsystem and a spacecraft controller, the spacecraft controller configured to:
    control the spacecraft in a three-axis stabilized mode, wherein, while in the three-axis stabilized mode, the spacecraft does not rotate about any axis at a rate greater than 0.1 degree/sec and dumping of momentum stored in a momentum storage system during each respective intervening coast period is avoided; and
    cause the propulsion subsystem to perform, while the spacecraft is continuously in the three-axis stabilized mode, one or more orbit raising maneuvers, each orbit raising maneuver comprising either or both of a chemical thruster firing and an electric thruster firing, any two consecutive orbit raising maneuvers being separated by a respective intervening coast period.

11. The spacecraft of claim 10, further comprising a solar array, the spacecraft controller being configured to deploy the solar array, prior to causing the propulsion system to perform the one or more orbit raising maneuvers.

12. The spacecraft of claim 10, wherein the momentum storage system comprises one or more reaction wheels and control authority for maintaining satellite orientation is provided by one or both of the reaction wheels and thrusters.

13. The spacecraft of claim 12, wherein control authority for maintaining satellite orientation is provided only by the reaction wheels.

14. The spacecraft of claim 10, wherein during orbit raising maneuvers, the spacecraft is in a maneuver orientation wherein a thrust vector of either or both of the chemical thruster and the electric thruster is aligned along a steering profile.

15. The spacecraft of claim 14, wherein during at least one of the intervening coast periods, the spacecraft is in a sun-safe orientation.

16. The spacecraft of claim 15, wherein reorientation from the sun-safe orientation to the maneuver orientation is performed by a slow slew of the spacecraft, using reaction wheels.

17. The spacecraft of claim 16, wherein the reorientation is performed without use of propellant.

18. The spacecraft of claim 10, wherein, at least one orbit raising maneuver comprises a chemical thruster firing and not an electric thruster firing.

19. The spacecraft of claim 10, wherein, at least one orbit raising maneuver comprises an electric thruster firing and not a chemical thruster firing.

* * * * *